No. 758,678. PATENTED MAY 3, 1904.
F. A. MÜLLER.
FLOWER POT.
APPLICATION FILED APR. 2, 1903.

NO MODEL.

Witnesses
Anna Lembke
Ewol Weiss

Inventor
Friedrich August Müller

No. 758,678. Patented May 3, 1904.

UNITED STATES PATENT OFFICE.

FRIEDRICH AUGUST MÜLLER, OF HANOVER, GERMANY.

FLOWER-POT.

SPECIFICATION forming part of Letters Patent No. 758,678, dated May 3, 1904.

Application filed April 2, 1903. Serial No. 150,852. (No model.)

*To all whom it may concern:*

Be it known that I, FRIEDRICH AUGUST MÜLLER, merchant, a subject of the King of Prussia, Emperor of Germany, and a resident of No. 6 Scheffelstrasse, Hanover, in the Empire of Germany, have invented new and useful Improvements in Flower-Pots and the Like, of which the following is a specification.

The present invention relates to improvements in flower-pots and the like, the purpose of which is to prevent the rotting of the roots and the stunting of the plants due to insufficiency in air-supply, to render impossible the turning sour of the earth, and to provide for a sufficient water-drainage.

Further objects of the invention are to simplify and cheapen the construction and to render more efficient, serviceable, and durable flower-pots of the kind referred to.

With these ends in view the invention consists in the novel combination, arrangement, and adaptation of parts, all as more fully hereinafter explained, shown in the accompanying drawings, and then set out in the appended claim.

Figure 1:
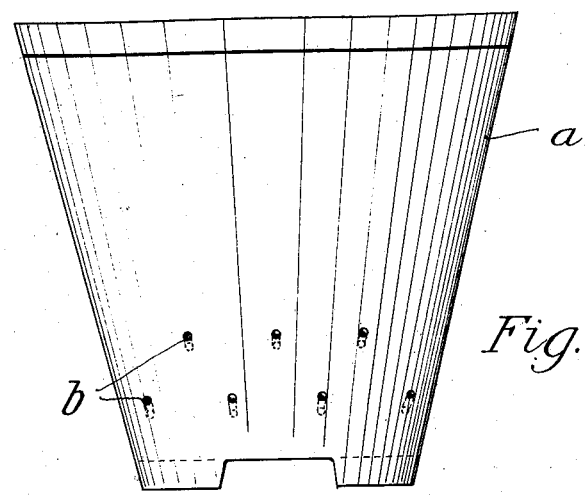
Figure 2:
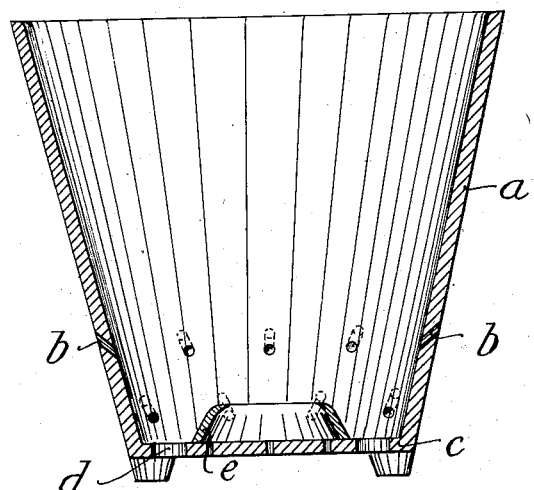
Figure 3:
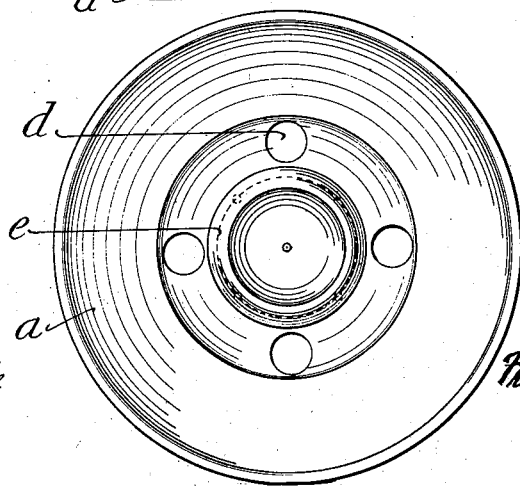

In the drawings, Figure 1 shows an external front elevation of a flower-pot according to the present invention. Fig. 2 is a central vertical section through Fig. 1, and Fig. 3 represents a plan view of Fig. 1.

The flower-pot *a*, of any suitable or desired shape, size, and material, is advantageously provided at its lower edge with feet in order to render possible the supply of fresh air through the holes in the bottom of the pot and to prevent fungosity in the lower portion of the pot. As is well known, these fungi are caused by the drained-off water which remains in the flower-pot saucer and prevents the access of fresh air to the lower portion of the flower-pot. The feet are suitably chosen high enough to prevent the contact between the drained-off water in the saucer and the bottom earth of the pot.

It has been observed that in flower-pots the roots always take up room at the lower edge and not centrally. The supply of fresh air and heat at this portion of the pot must therefore enhance the growth of the plants in a hitherto unknown manner. According to the present invention the lower edge of the pot *a* is provided with a row or rows of apertures *b*, which are inclined toward the bottom, and thus guide a sufficient quantity of fresh air and heat to the roots directly. The bottom *c* shows a plurality of uniformly-distributed holes *d*, which serve for the air and heat circulation and for the draining off of the superfluous water. In practice I have found that the arrangement of four holes *d*, as shown, is most advantageous.

On the bottom *c* is placed or secured a conical ring *e*, open at the top. Chalk or a like substance may be placed in this ring in order to assist in the prevention of the turning sour of the earth.

Plants placed in a flower-pot according to the present invention show a sound luxuriant growth owing to the rich supply of fresh air and heat to the roots directly and owing to the preservation of the earth.

What I claim as my invention, and desire to secure by Letters Patent, is—

A flower-pot having downwardly-inclined apertures in the lower portion of the pot, a plurality of uniformly-distributed holes in the bottom, and a conical ring open at the top, substantially as and for the purpose set forth.

In witness whereof I have hereunto signed my name, this 16th day of October, 1902, in the presence of two subscribing witnesses.

FRIEDRICH AUGUST MÜLLER.

Witnesses:
ERNST FREYTAG,
LEONORE RASCH.